(12) United States Patent
Clucas (10) Patent No.: US 11,930,195 B2
(45) Date of Patent: Mar. 12, 2024

(54) DECODING A VIDEO SIGNAL IN A VIDEO DECODER CHIPSET

(71) Applicant: V-NOVA INTERNATIONAL LIMITED, London (GB)

(72) Inventor: Richard Clucas, London (GB)

(73) Assignee: V-NOVA INTERNATIONAL LIMITED (GB)

( * ) Notice: Subject to any disclaimer, the term of this patent is extended or adjusted under 35 U.S.C. 154(b) by 22 days.

(21) Appl. No.: 17/441,042

(22) PCT Filed: Apr. 3, 2020

(86) PCT No.: PCT/GB2020/050895
§ 371 (c)(1),
(2) Date: Sep. 20, 2021

(87) PCT Pub. No.: WO2020/208343
PCT Pub. Date: Oct. 15, 2020

(65) Prior Publication Data
US 2022/0159280 A1    May 19, 2022

(30) Foreign Application Priority Data
Apr. 11, 2019 (GB) ..................... 1905175

(51) Int. Cl.
*H04N 19/34* (2014.01)
*H04N 19/182* (2014.01)
*H04N 19/436* (2014.01)
*H04N 19/85* (2014.01)

(52) U.S. Cl.
CPC ........... *H04N 19/34* (2014.11); *H04N 19/182* (2014.11); *H04N 19/436* (2014.11); *H04N 19/85* (2014.11)

(58) Field of Classification Search
CPC .... H04N 19/85; H04N 19/436; H04N 19/182; H04N 19/34
See application file for complete search history.

(56) References Cited

U.S. PATENT DOCUMENTS

| | | | |
|---|---|---|---|
| 2005/0105814 A1 | 5/2005 | Bruls et al. | |
| 2011/0286526 A1 | 11/2011 | Nakagami et al. | |
| 2014/0089980 A1 | 3/2014 | Alexander et al. | |
| 2014/0313231 A1* | 10/2014 | Wyman ................. | G06T 3/0056 345/660 |
| 2015/0334389 A1 | 11/2015 | Sato | |

OTHER PUBLICATIONS

International Search Report and Written Opinion for PCT/GB2020/050895 dated Jul. 15, 2020.
Jill Boyce et al: "Overview of SHVC: Scalable Extensions of the High Efficiency Video Coding (HEVC) Standard", IEEE Transactions on Circuits and Systems for Video Technology, Jan. 1, 2015 (Jan. 1, 2015), pp. 1-1, XP055210971, ISSN: 1051-8215, DOI: 10.1109/TCSVT.2015.2461951.

* cited by examiner

*Primary Examiner* — On S Mung
(74) *Attorney, Agent, or Firm* — WORKMAN NYDEGGER (57) ABSTRACT

A computer-implemented method retrofit for decoding video in a video decoding chipset is disclosed. The method comprises receiving a video signal and a picture improvement signal; decoding the video signal to create decoded video; deriving, from the picture improvement signal, pixel touching information to be used to modify a pixel of the decoded video; and causing a graphics feeder of the video decoding chipset to overlay the pixel touching information onto the decoded video.

14 Claims, 9 Drawing Sheets

DECODING A VIDEO SIGNAL IN A VIDEO DECODER CHIPSET

CROSS-REFERENCE TO RELATED APPLICATIONS

The present application is a 371 US Nationalization of International Patent Application No. PCT/GB2020/050895, filed Apr. 3, 2020, which claims priority to UK Patent Application No. 1905175.4, filed Apr. 11, 2019, the entire disclosures of which are incorporated herein by reference.

TECHNICAL FIELD

The invention relates to a video decoder chipset, and in particular, a method of decoding a video signal in a video decoder chipset.

BACKGROUND

Legacy video decoders, such as those found in set-top boxes or in televisions, cannot operate with the latest decoding technologies due to hardware constraints. Often the legacy video decoders require a higher bit rate video stream in order to reproduce a given picture quality when compared to newer hardware. Additionally, newer picture enhancement technologies cannot be implemented on the legacy video decoders.

There are a large number of legacy video decoders still in use, and it would be very expensive, and not practical, to upgrade or replace those legacy video decoders with new hardware. As a result, the use of available broadcasting and network bandwidths may not be efficient, and their use is certainly not optimal. This prevents or discourages the take up and use of newer video coding technologies, and can slow the adoption of higher quality video coding techniques.

Patent publication US2015/0156469 A1 to Dolby Laboratories Licensing Corporation discloses systems and methods for decoding and displaying enhanced dynamic range (EDR) video signals. To accommodate legacy digital media players with constrained computational resources, compositing and display management operations are moved from a digital media player to its attached EDR display.

There is a need to reduce the bandwidth requirements of legacy video decoders, while maintaining or even improving the viewing experience for a user watching video content, at a relatively low cost.

SUMMARY

A solution is to provide a way to allow for a "software update" or "software retrofit" to legacy decoding hardware as mentioned above. However, an additional problem with legacy decoders is that they have a fixed and limited memory bandwidth, and digital rights management requirements prohibit the reading of decoded frames from memory, which adds to the complexity of a solution in software.

According to the disclosure, existing hardware can be utilised, with a software update, to do the following:
  Decode an underlying video stream as normal; and
  Use the legacy CPU and Graphics Feeder hardware, normally used for creating an electronic program guide (EPG) or other GUI overlay, to add a layer of pixel touching to each video frame or portion thereof of the decoded video stream.

This allows for a software update to legacy decoding hardware commonly found in set-top boxes, which does not require additional memory accesses, and which does not need to read decoded video frames from memory.

There is provided a computer-implemented method as set out in the appended claims. There is also provided a corresponding computer program, computer readable medium, and decoder.

A first aspect provides a computer-implemented method of decoding video in a video decoding chipset. The method comprises receiving a video signal and a picture improvement signal, decoding the video signal to create decoded video, deriving, from the picture improvement signal, pixel touching information to be used to modify a pixel of the decoded video, and causing a graphics feeder of the video decoding chipset to overlay the pixel touching information onto the decoded video.

The method may comprise upscaling the decoded video prior to overlaying the pixel touching information thereon. The method may comprise upscaling the decoded video using the video decoder chipset hardware.

The method may comprise upscaling the pixel touching information prior to overlaying the pixel touching information onto the decoded video.

The method may comprise separating the video signal into a base layer and an enhancement layer, and applying the enhancement layer to the base layer to create the decoded video.

The method may comprise deinterlacing the decoded video. The method may comprise deinterlacing the decoded video prior to upscaling the decoded video. The method may comprise deinterlacing the decoded video using the video decoder chipset hardware.

The method may comprise directly deriving the pixel touching information from the improvement signal when the improvement signal is a map describing changes to one or more pixels of the frame.

The method may comprise deriving the pixel touching information as a map from the improvement signal.

The method may comprise receiving the additional information via a different communications channel than the video signal.

According to another aspect there is provided a video decoder configured to carry out the computer-implemented method as described above.

According to another aspect there is provided a computer program product comprising instructions which, when the program is executed by a computer, cause the computer to carry out the method described above.

According to another aspect there is provided a computer-readable storage medium comprising instructions which, when the program is executed by a computer, cause the computer to carry out the method described above.

BRIEF DESCRIPTION OF THE DRAWINGS

Embodiments of the invention will now be described with reference to the accompanying drawings, in which.

DETAILED DESCRIPTION OF THE EMBODIMENT(S)

Figure 1:
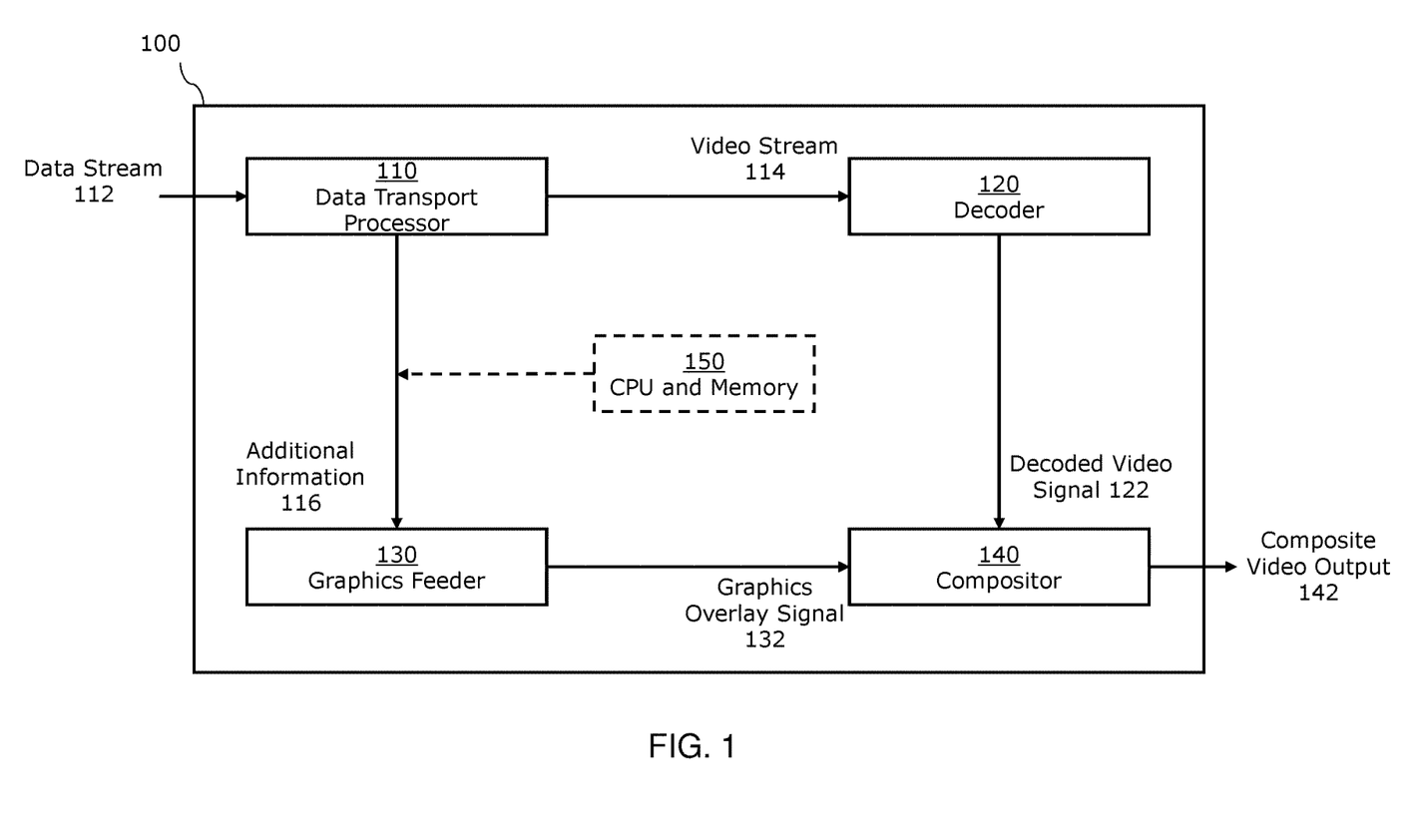
FIG. 1 is a block diagram illustrating the basic hardware layout of a typical prior art legacy video decoder.

FIG. 1 is a block diagram illustrating the basic hardware layout of a typical prior art legacy video decoder 100. This explanation is useful in order to explain the operation of a computer-implemented method, or software "retrofit", which follows thereafter.

The legacy video decoder 100 comprises the following components (which may be hardware or software modules as needed): a data transport processor 110, or other type of receiver, configured to receive an input stream 112, or input signal, and derive a video stream 114, or video signal, therefrom; a decoder 120 configured to receive and decode the video signal 114 according to a video decoding technology, and output a decoded video signal 122, typically frame-by-frame, so that video represented by the video signal can be displayed; a graphics feeder 130 configured to generate a graphics overlay signal 132 for superimposing onto the decoded video signal 122; and a compositor 140, which is arranged to composite the decoded video signal 122 and the graphics overlay signal 132. The legacy video decoder 100 also typically comprises a CPU and memory 150 which control the aforesaid components, and in the case of at least one of the components, such as the decoder 120, implement the functionality of the component. However, mostly it is anticipated that the components in the legacy video decoder 100 are hardware modules or units.

The receiver 110 is a known receiver and can be of any suitable type, as would be understood by a skilled person in this field, and is capable of receiving the input signal 112 in a variety of formats, such as in a broadcast format over a terrestrial over the air broadcast system, or via a video stream sent over a network-based protocol. The receiver 110 is configured to derive the video signal 114 therefrom. The receiver 110 may also receive additional information accompanying the video signal 114 such as graphical information for overlay, or an electronic program guide (EPG).

The decoder 120 is a known type of decoder configured to and capable of decoding the video signal 114 to produce a decoded video signal 122. The decoder would typically be capable of decoding an MPEG-encoded video signal (by that it is meant a video signal encoded according to a known or future MPEG standard, such as MPEG-2, MPEG-4, or a related standard such as H.264 or H.265). The decoder may have multiple decoding capabilities, or there may be several decoders 120, each having a different decoding capability.

The graphics feeder 130 is of the type known to those skilled in the art, and is configured to receive information 116 from a source within the legacy video decoder 100, such as the receiver 110 which may provide information 116 derived from the input signal 112, such as the aforesaid EPG information, or from another source, such a menu generating source (not shown), or the CPU 150, which are configured to provide input/output functionality to a user via a connected video display (not shown). The graphics feeder 130 appropriately configures the information 116 as necessary into the graphics overlay signal 132 which is suitable for and is latterly composited onto the decoded video signal 122, and passes the graphics overlay signal 132 to the compositor 140.

The compositor 140 is of the type known to those skilled in the art, and is configured to composite the decoded video signal 122 received from the decoder 120 and the graphics overlay signal 132 received from the graphics feeder 130.

Figure 2:
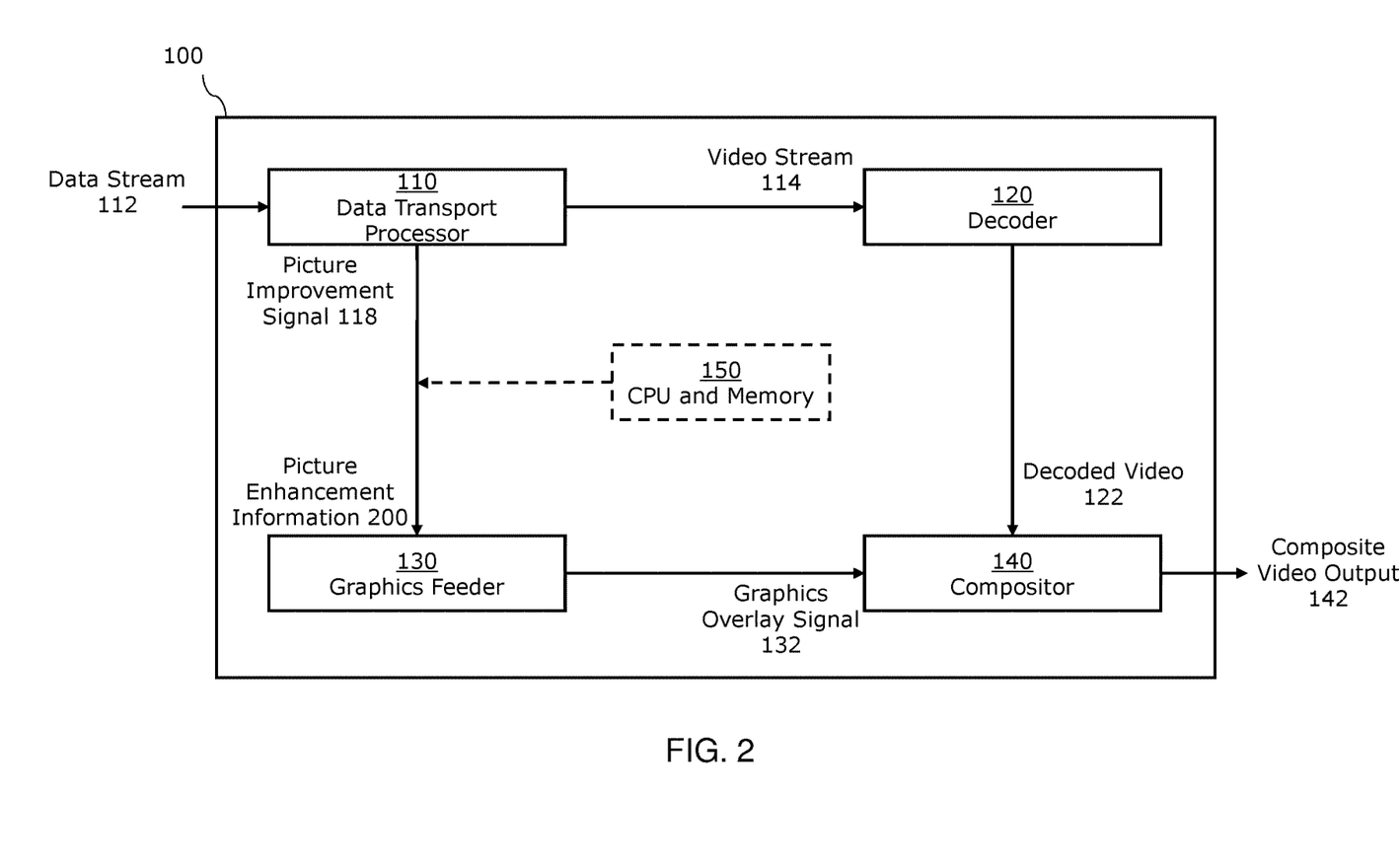
FIG. 2 is a block diagram based on FIG. 1, but showing a modified flow of information illustrating how the present disclosure provides a modification to the software on the video decoder chipset.

FIG. 2 is a block diagram based on FIG. 1, where only the differences are described, and showing a modified flow of information illustrating how the present disclosure provides a modification to the software on the video decoder chipset 100 to use the graphics feeder 130 to deliver picture enhancements to the decoded video signal 122. The basic hardware layout of the typical prior art legacy video decoder 100 remains unchanged, but the data transport processor 110 and CPU and memory 150 separately or together provide the graphics feeder 130 with picture enhancement information 200, as a replacement for, or in addition to, the additional information 114. The picture enhancement information 200 improves the picture quality of the decoded video signal 122 in the composite video output 142.

Figure 3:
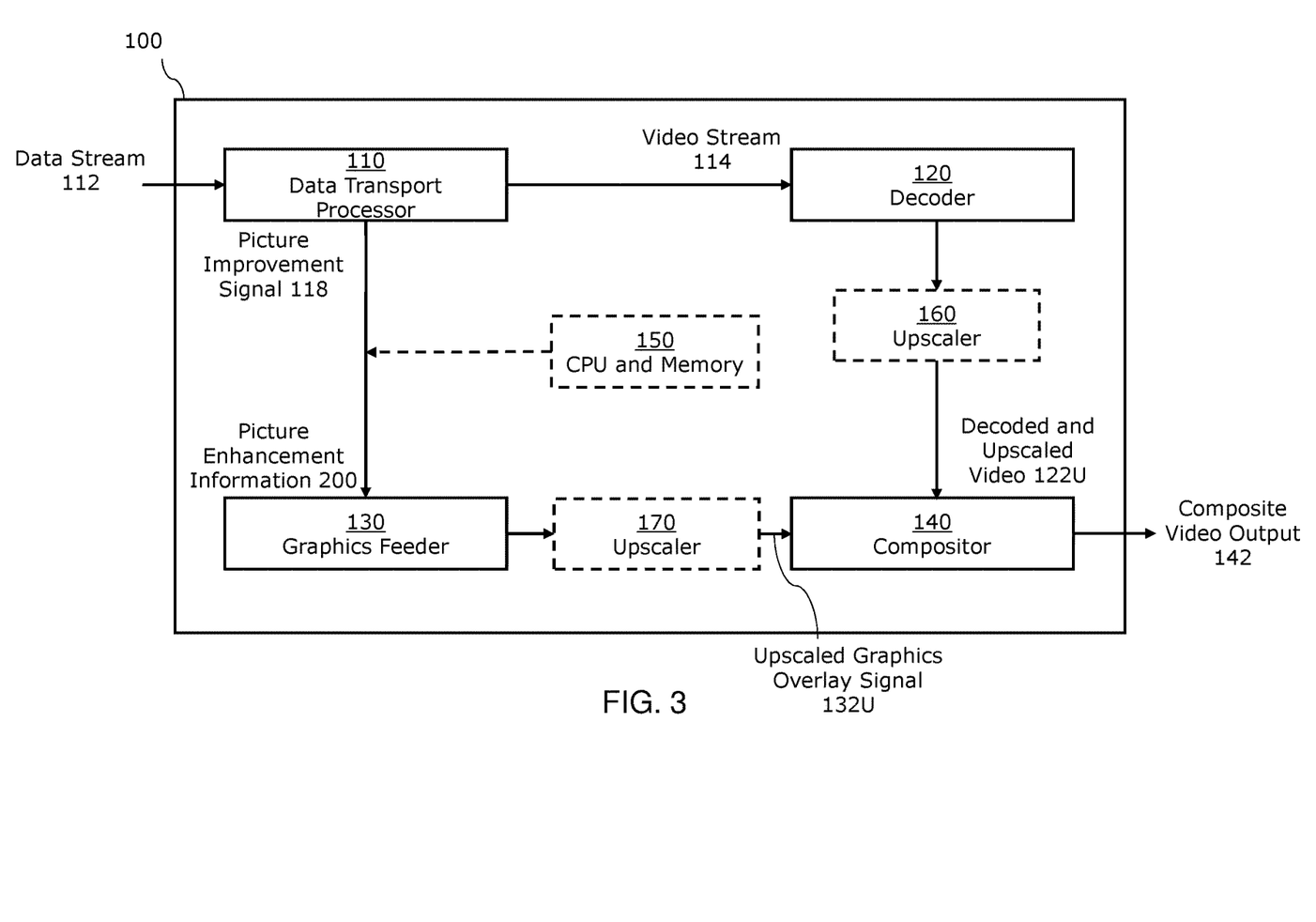
FIG. 3 is a block diagram based on FIG. 2, but showing an embodiment wherein the legacy video decoder chipset has upscaling functionality.

FIG. 3 is a block diagram based on FIG. 2, where only the differences are described, and showing an embodiment wherein the legacy video decoder chipset 100 has upscaling functionality.

Upscaler 160 is provided in this example legacy video decoder chipset 100, and is used to upscale the decoded video 122 to provide a resolution enhancement, or enlargement. The graphics overlay signal 132 may be applied to the decoded and upscaled video 122 in order to provide an enhanced picture quality to the upscaled video 122. In this example, there is also provided an upscaler 170 which is configured to upscale the graphics overlay signal 132 to create an upscaled graphics overlay signal 132U. However, it is anticipated that the picture enhancement information 200 will be designed such that no upscaling is required as long as the graphics feeder 130 is capable of providing the graphics overlay signal 132 at a resolution which matches the resolution of the video 122 or 122U at the compositor. The upscaling may be implemented by techniques known to those skilled in the art.

Figure 4:
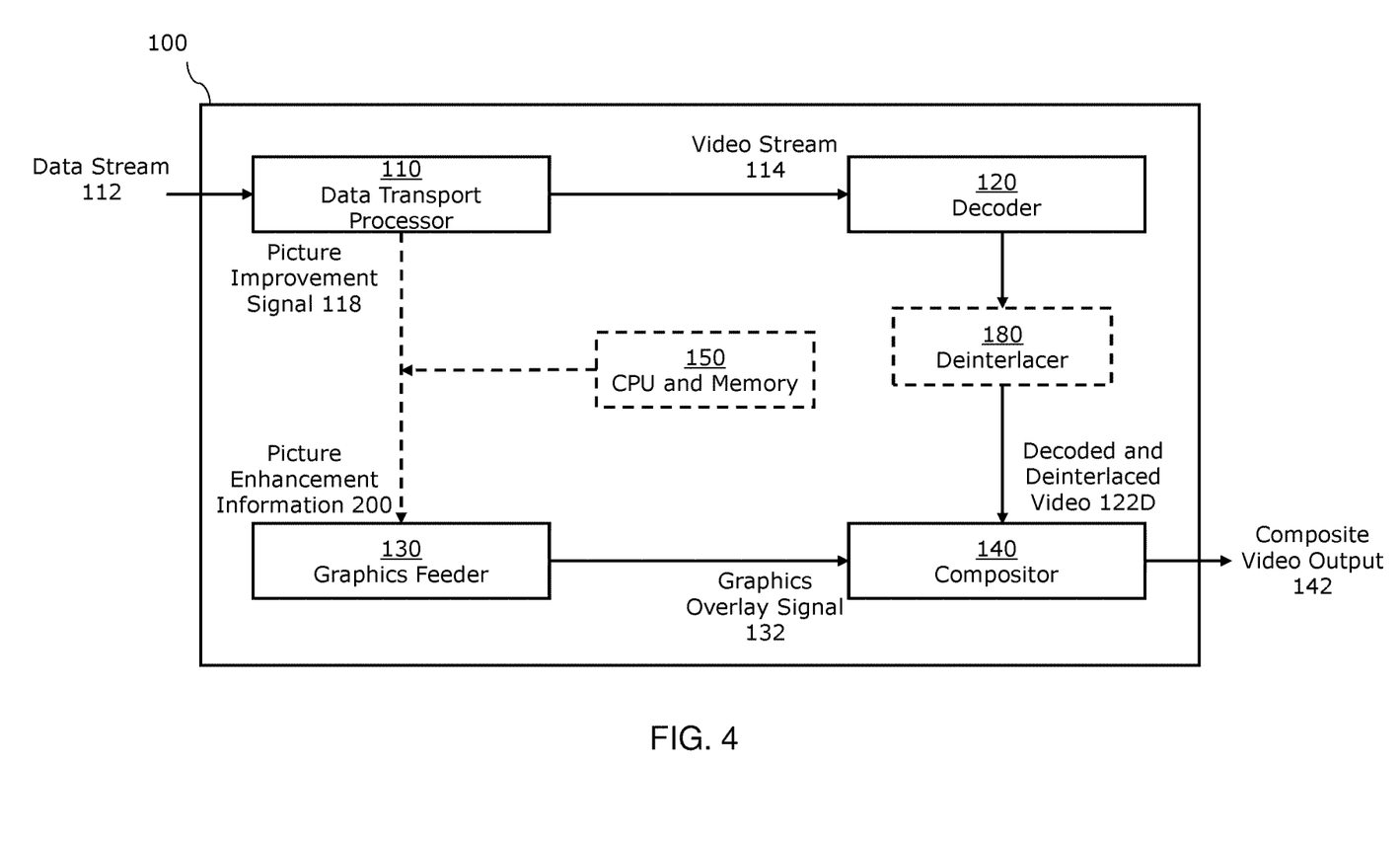
FIG. 4 is a block diagram based on FIG. 2, but showing an embodiment wherein the legacy video decoder chipset has deinterlacing functionality.

FIG. 4 is a block diagram based on FIG. 2, where only the differences are described, and showing an embodiment wherein the legacy video decoder chipset 100 has de-interlacing functionality.

Deinterlacer 180 is provided in this example legacy video decoder chipset 100, and is used to deinterlace the decoded video 122 to create decoded and deinterlaced video 122D. This allows for the picture improvement signal 118 to be programmed for a progressive video frame. The deinterlacing may be implemented by techniques known to those skilled in the art.

Figure 5:
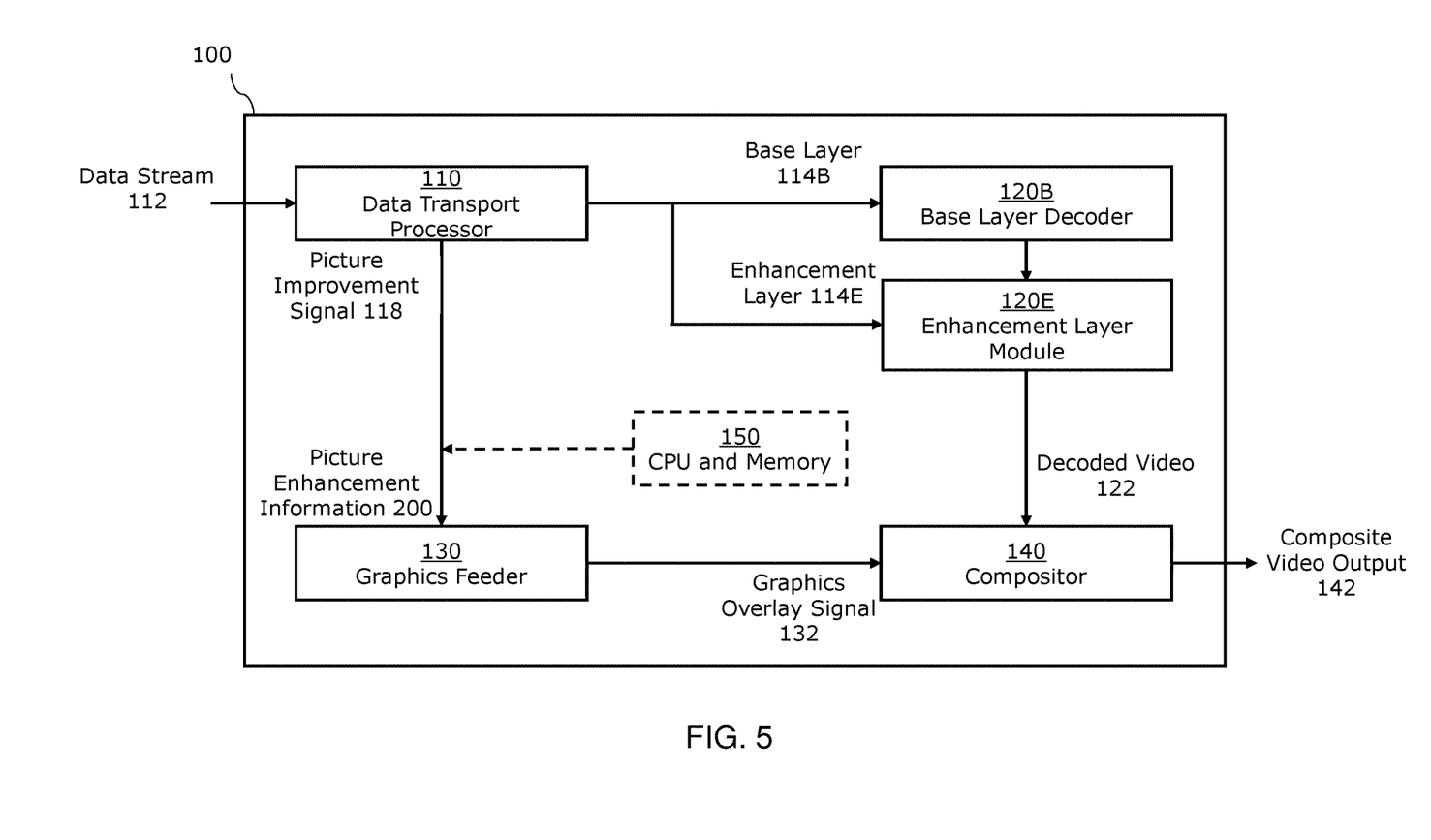
FIG. 5 is a block diagram based on FIG. 2, but showing how a multi-layer video signal structure is handled.

FIG. 5 is a block diagram based on FIG. 2, where only the differences are described, and showing how a multi-layer video signal 114 structure is handled. The video signal 114 comprises, for example, a base layer 114B and an enhancement layer 114E. The data transport processor 110 is configured to separate the two layers using packet ids (PIDs), and transmit them to the appropriate decoder module. In the case of the base layer 114B, this is to the base layer decoder 120B, which would be identical to or equivalent to the decoder 120 previously described. The enhancement layer 114E is handled in a software module, the enhancement layer module 120E.

Or, in the absence of suitable hardware on the legacy decoder chipset 100, and is configured to decode and apply enhancements to the base layer. In summary, the computer-implemented method in this scenario is configured to decode the multi-layer structure by applying the enhancement layer 420 to the base layer 410 to create the frame of video. This is in addition to the pixel touching enhancements provided via the graphics feeder 130.

Figure 6:
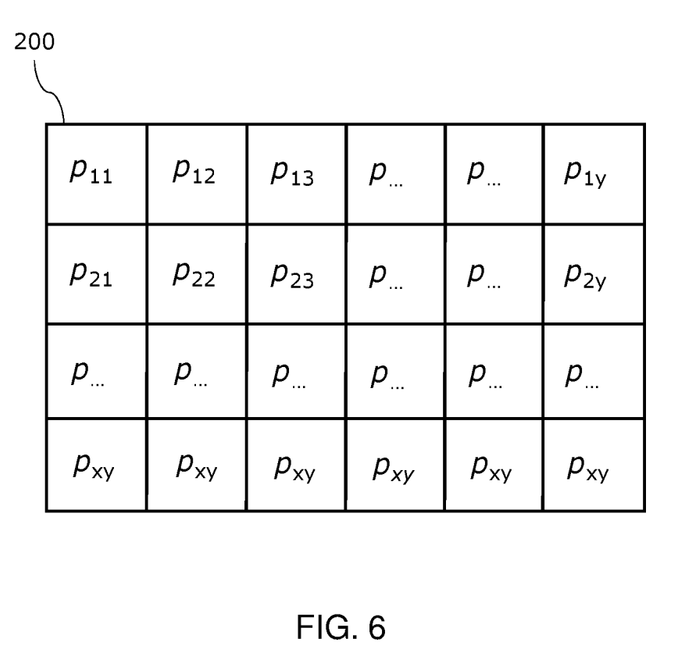
FIG. 6 is a block diagram which illustrates the content of the picture enhancement information.

FIG. 6 is a block diagram which illustrates the content of the picture enhancement information 200. In this example disclosure, the computer-implemented method directly obtains the picture enhancement information 200 from the picture improvement signal 118. However, in an alternative example, the picture enhancement information 200 must be derived from the picture improvement signal 118 to create the appropriate pixel touching information. In this example, the picture improvement signal 118, and also the picture enhancement information 200, is a pixel map which describes changes to the pixels of the decoded video video (there may be no changes, or only a small number of pixels may need to be changed, or all pixels may need to be changed). The pixel map contained in the picture enhancement information 200 is suitable for overlaying on the decoded video 122. The pixel map comprises an entry for each pixel, $p_{x,y}$, in a frame. Each entry would have the effect of altering the value for that pixel when composited with the decoded video 122 prior to output on a display.

The picture enhancement information 200, via the graphics feeder 130 and compositor 140, is arranged to be synchronised with the decoded video 122 so that the appropriate enhancements are made to the correct part of the decoded video 122. Typically, the picture enhancement information 200 is configured to improve the picture quality of a frame of decoded video data 122.

Figure 7:
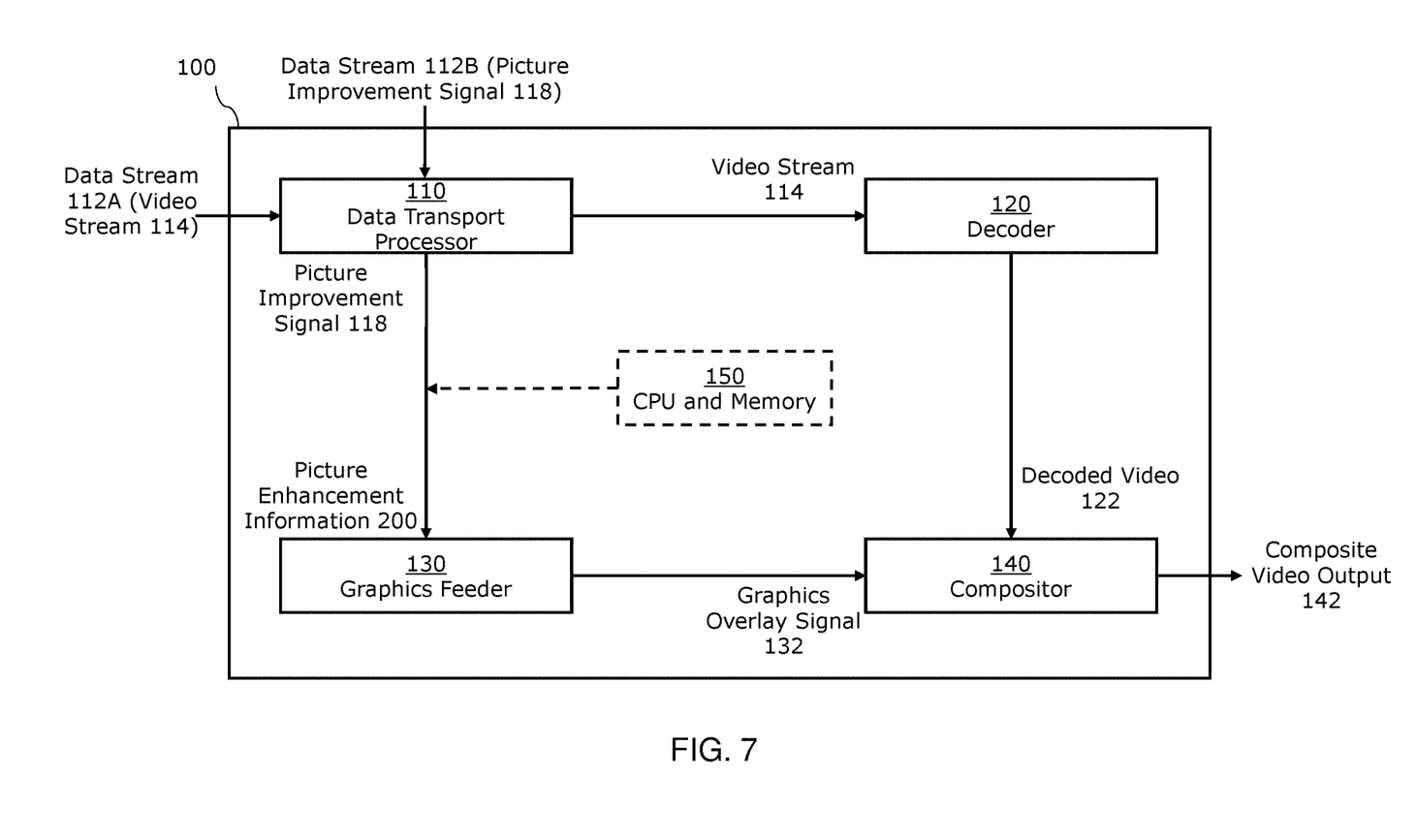
FIG. 7 is a block diagram based on FIG. 2, but showing a situation where the legacy video decoder chipset receives two separate data streams.

FIG. 7 is a block diagram based on FIG. 2, where only the differences are described, and showing a situation where the legacy video decoder chipset 100 receives two separate data streams, namely data stream 112A comprising the video stream 114, and data stream 112B comprising the picture improvement signal 118. This contrasts with the example of FIG. 2, which shows a single data stream 112 comprising both the video stream 114 and the picture improvement signal 118. In FIG. 7, the two data streams, or signals, 112A and 112B are delivered via a different transport mechanism. Data stream 112A comprising the video stream 114 is delivered via a broadcast mechanism, such as an over the air broadcast mechanism, while data stream 112B is delivered on demand over a network. However, the two data streams 112A and 112B may be delivered via other transport mechanisms, and may be delivered on the same transport mechanism, albeit as different streams.

Figure 8:
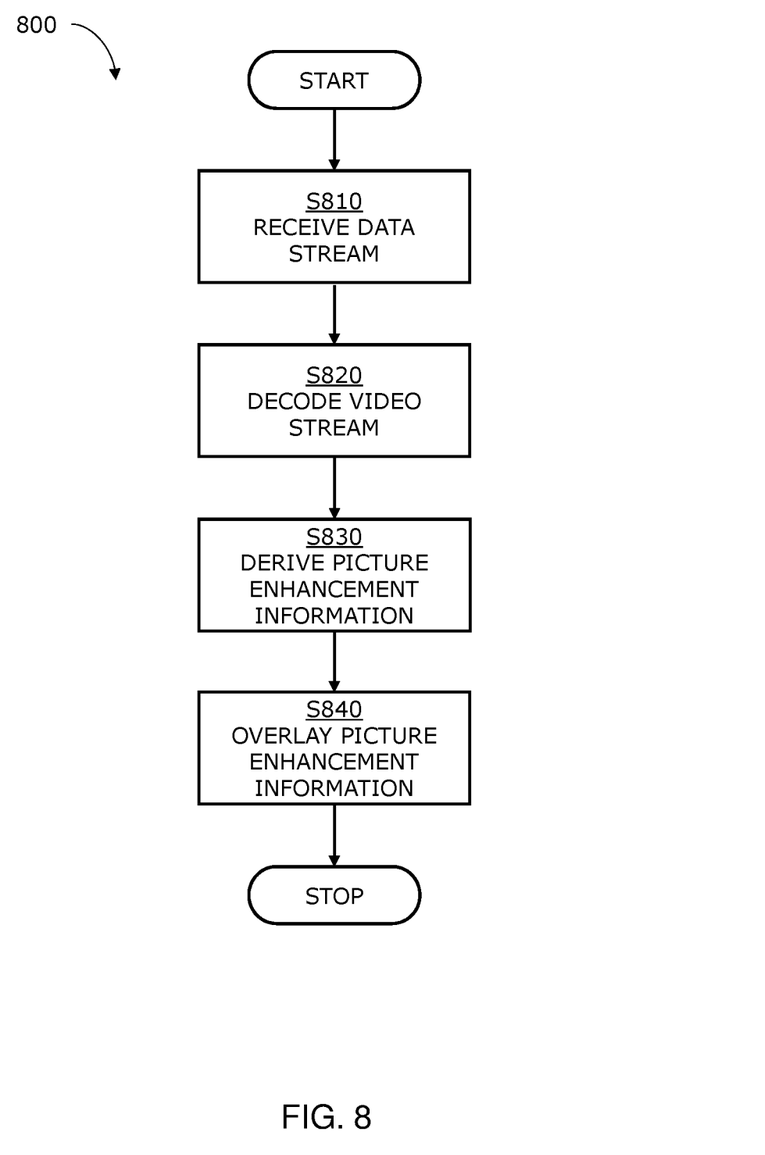
FIG. 8 is a flow chart which describes the operation of a computer-implemented method in accordance with this disclosure.

FIG. 8 is a flow chart which describes the operation of a computer-implemented method 800 in accordance with this disclosure. The computer-implemented method is designed to be executed by processing functionality in a legacy video decoder chipset, such as the CPU and memory 150 existing on the example legacy video decoder chipset 100 of FIGS. 1 to 5 and 7, and hence is suitable to be implemented as a software "retrofit".

As mentioned above, an important element is a modified use of the graphics feeder 130. In this disclosure, the graphics feeder 130 is used not only to display a graphics overlay for the purposes of user input/output or other output signal to the user (such as a menu display, EPG display, etc.), but also to improve the quality of the video picture by allowing pixel enhancements to be overlaid. The enhancements are communicated to the legacy video decoder chipset 100 either with the data stream 112 containing the video stream or signal 114, or are communicated via a separate channel. The picture enhancement information 200 is also referred to as pixel touching information, and is used to modify the pixel values of the decoded video signal 122 during composition therewith at the compositor 140. The picture enhancement information 200 is packaged as a picture improvement signal 118 during transmission and one of the CPU and memory 150 or the data transport processor 110, or both, are arranged to translate or decode the picture improvement signal into the picture enhancement information 200 as required.

Referring again to FIG. 8, the computer-implemented method 800 comprises, at step S810, receiving the video signal, or video stream 114, and the picture improvement signal 118. At step S820, decoding the video signal 114 into decoded video 122. At step S830, if necessary, deriving from the picture improvement signal 118 the picture enhancement information 200 which in turn is used as, or is used to create, the graphics overlay signal 132. The graphics overlay signal 132 is of course sent to the compositor 140 to be overlaid onto the decoded video 122. At step S840, causing the compositor 140 to overlay the graphics overlay signal onto the decoded video 122. Steps S820 to S840 are repeated as necessary for each frame in the video signal 114. It is anticipated that this disclosure will find most use when the decoded video 122 is a frame of video, but the disclosure will still find use when the decoded video is a part of a frame of video, and/or the picture enhancement information 200 is applied to only a part of a frame of video.

In this way, by using the graphics feeder 130 to introduce picture enhancements, it becomes possible to provide a software "retrofit" to existing decoder hardware devices in such a manner that does not require additional memory, or memory accesses of decoded frames, and which produces an enhanced picture quality. This allows for an accelerated take up of newer video coding technologies, as a new channel for picture enhancements is created, and can allow for lower bandwidths to be used for the video signal 114, as enhancements to the video can be made via the graphics feeder 130.

Figure 9:
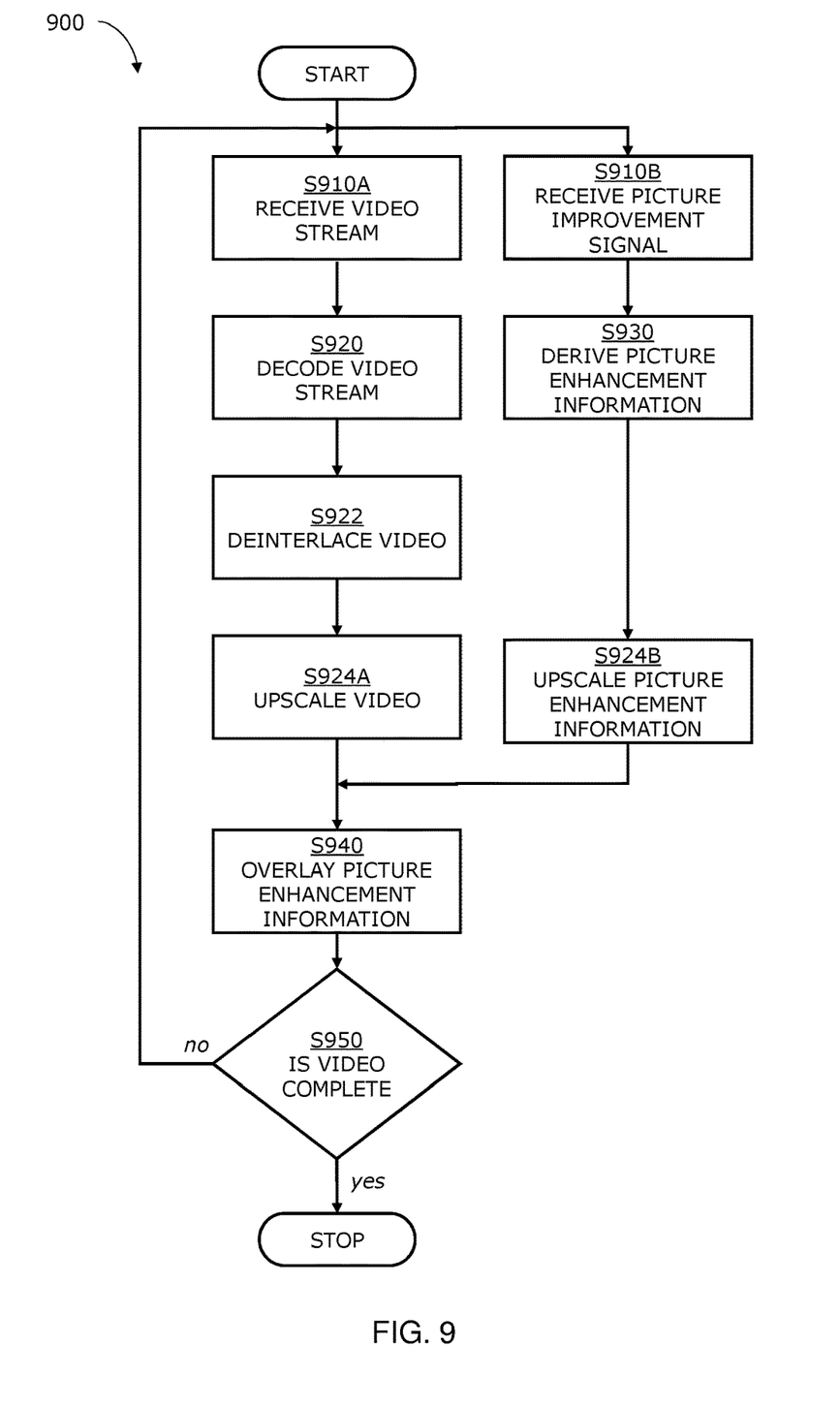
FIG. 9 is a flow chart which illustrates a more detailed version of the flow chart of FIG. 8, including optional upscaling and deinterlacing steps.

FIG. 9 is a flow chart which illustrates a more detailed version of the flow chart of FIG. 8, including optional upscaling and deinterlacing steps.

In the method shown in FIG. 9, the receive step S810 of FIG. 8 is shown as two steps: step S910A and step S910B. Step 910A is for receiving the video signal 114, which may be received via a channel separate from the picture improvement signal 118, or received on the same channel. Step 910B is for receiving the picture improvement signal 118, which may be received via a channel separate from the video signal 114, or received on the same channel. Step S920 is the same as for FIG. 8, comprising outputting a decoded video signal, typically a frame of video 122. Step S930 is the same as for FIG. 8, comprising outputting pixel touching information as the graphics overlay signal 132.

The computer-implemented method is also configured optionally to perform the task of deinterlacing the frame of video at step S922 prior to upscaling or compositing. The computer-implemented method is configured to control the video decoding chipset 100 hardware to deinterlace the frame of video using the video decoder chipset 100 hardware, but this step may be performed in software depending on the capability of the video decoder chipset 100 and associated CPU and memory 150.

The computer-implemented method optionally comprises the step of upscaling at step S924A the frame of video 122 prior to overlaying the pixel touching information 132 onto the frame of video 122, in order to generate a higher pixel resolution for the eventually displayed frame of video. Upscaling the frame of video 122 is conveniently achieved using the video decoder chipset 100 hardware, but may also be achieved in software, either using an existing software mechanism, or by introducing a software upscaler with the software "retrofit". There is also disclosed an optional step S924B of upscaling the pixel touching information prior to overlaying the pixel touching information 132 onto the decoded video 122, but this is unlikely to be used in practice. It is most likely that the pixel touching information will be at a resolution that best fits over the upscaled decoded video 122 in order to maximise resolution enhancements. The picture enhancement information 200, via the graphics overlay information 132, is then overlaid onto the decoded video 122 at step S940, similarly to step S840 in FIG. 8. At step S950, a check is performed to see if further video, such as video frames, are to be decoded, and if so, then the method proceeds back to steps S910A and S910B. If not, then the method stops.

A video decoder 100, such as the one described with reference to FIGS. 1 to 5 and 7, is intended to be configured to carry out the computer-implemented method described above. A computer program product comprising is provided with instructions which, when the program is executed by a computer, cause a video decoder to carry out the method described above, and separately to be stored on a computer-readable storage medium.

While this disclosure has been described with reference to a legacy video decoder, it is of course possible to implement the disclosure on non-legacy video decoders as necessary, as long as the legacy video decoder has the hardware capability to overlay the improvement information in the way disclosed.

The picture improvement signal 118, and associated picture enhancement information 200 which is directly or indirectly derived therefrom, is distinguished in this disclosure from other sorts of information that is used by the graphics feeder 130 to produce menus or other user output information that is separate from the decoded video, such as information delivered through the MPEG Program and System Information Protocol (PSIP). The picture enhancement information 200 is used to improve the picture quality so that the eventually displayed video is closer to, or is an identical match to, an original version of the video prior to encoding.

It is to be understood that any feature described in relation to any one example or embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A computer-implemented method of decoding video in a video decoding chipset, the video decoding ellipse comprising a data transport processor, a decoder, a graphics feeder, and a compositor, the method comprising:

receiving a video signal and a picture improvement signal at the data transport processor;

decoding the video signal at the decoder to create decoded video;

deriving, from the picture improvement signal, pixel touching information to be used to modify a pixel of the decoded video;

providing the graphics feeder with the pixel touching information to produce and to deliver picture enhancements to the decoded video, the pixel touching information produced as a graphics overlay signal for superimposing into the decoded video; and providing the pixel touching information to the compositor to compose the decoded video and the graphics overlay signal to provide a composite video output comprising the decoded video and the output of the graphics feeder.

2. The computer-implemented method of claim 1, comprising upscaling the decoded video prior to overlaying the pixel touching information thereon.

3. The computer-implemented method of claim 2, comprising upscaling the decoded video using the video decoder chipset hardware.

4. The computer-implemented method of claim 1, comprising upscaling the pixel touching information prior to overlaying the pixel touching information onto the decoded video.

5. The computer-implemented method of claim 1, comprising separating the video signal into a base layer and an enhancement layer, and applying the enhancement layer to the base layer to create the decoded video.

6. The computer-implemented method of claim 1, comprising deinterlacing the decoded video.

7. The computer-implemented method of claim 2, comprising deinterlacing the decoded video prior to upscaling the decoded video.

8. The computer-implemented method of claim 6, comprising deinterlacing the decoded video using the video decoder chipset hardware.

9. The computer-implemented method of claim 1, comprising directly deriving the pixel touching information from the picture improvement signal when the picture improvement signal is a map, wherein the map has an entry for each pixel in a frame, each entry describing any changes to be made to its associated pixel.

10. The computer-implemented method of claim 1, comprising deriving the pixel touching information as a map from the picture improvement signal, wherein the map has an entry for each pixel in frame, each entry describing any change to be made to its associated pixel.

11. The computer-implemented method of claim 1, comprising receiving the picture information signal via a different communications channel than the video signal.

12. A video decoder configured to carry out the computer-implemented method of claim 1.

13. A non-transitory computer program product comprising instructions which, when the program is executed by a computer, cause the computer to carry out the method of claim 1.

14. A non-transitory computer-readable storage medium comprising instructions which, when the program is executed by a computer, cause the computer to carry out the method of claim 1.

* * * * *